(12) United States Patent
van Breugel et al.

(10) Patent No.: US 7,824,592 B2
(45) Date of Patent: Nov. 2, 2010

(54) BOND LINE FORMING METHOD (75) Inventors: Sjef van Breugel, Enschede (NL); Willem Bakhuis, Nijverdal (NL); Andy Billen, Daarleveen (NL)

(73) Assignee: General Electric Company, Schenectady, NY (US)

( * ) Notice: Subject to any disclaimer, the term of this patent is extended or adjusted under 35 U.S.C. 154(b) by 1062 days.

(21) Appl. No.: 11/534,364

(22) Filed: Sep. 22, 2006

(65) Prior Publication Data

US 2008/0075603 A1   Mar. 27, 2008

(51) Int. Cl.
*B29C 65/54* (2006.01)

(52) U.S. Cl. ............... 264/263; 264/46.4; 264/46.5; 264/46.6; 264/415; 264/425

(58) Field of Classification Search .............. None
See application file for complete search history.

(56) References Cited

U.S. PATENT DOCUMENTS

| | | | | | |
|---|---|---|---|---|---|
| 2,767,461 | A | * | 10/1956 | Lebold et al. | 29/889.6 |
| 3,055,437 | A | * | 9/1962 | Stack | 416/226 |
| 4,471,020 | A | * | 9/1984 | McCarthy | 428/309.9 |
| 5,042,968 | A | * | 8/1991 | Fecto | 416/226 |
| 5,173,227 | A | * | 12/1992 | Ewen et al. | 264/46.6 |
| 5,908,591 | A | * | 6/1999 | Lewit et al. | 264/46.4 |
| 6,532,658 | B2 | * | 3/2003 | Schreiber | 29/889.71 |
| 7,473,385 | B2 | * | 1/2009 | Stiesdal et al. | 264/314 |
| 2003/0116262 | A1 | * | 6/2003 | Stiesdal et al. | 156/245 |

* cited by examiner

*Primary Examiner*—Edmund H. Lee
(74) *Attorney, Agent, or Firm*—Global Patent Operation; Douglas D. Zhang (57) ABSTRACT A method for forming a bond between a first and a second shell of a blade is provided. The method comprises the steps of forming a cavity between said first and second blade shells and filling an adhesive into said cavity to form a bond line between said first and second blade shells.

17 Claims, 6 Drawing Sheets

BOND LINE FORMING METHOD

BACKGROUND OF THE INVENTION

The present invention relates to the formation of bond lines between two components to be bonded together and, particularly, to the formation of a bond line between two shells of a wind turbine rotor blade.

Wind power has attracted much attention during recent years as an alternative source of energy. Wind turbines are used to convert the kinetic wind energy into electric power. For this purpose, utility-class wind turbines have wind rotors which are usually equipped with three huge rotor blades to extract kinetic energy from the wind. Typical lengths for these rotor blades range between 10 and 100 meters. There exists different rotor blade designs but typically the rotor blades are made of fiber-reinforced materials, e.g. glass fiber, carbon fiber, organic aramide fibers or the like. Furthermore, wind turbine rotor blades are typically of a composite design, i.e. the blade body is manufactured from two blade shells which are bonded together.

The current method for bonding together the blade shells is as follows. A suitable adhesive is applied to the surface of one or both blade shells which are then brought into contact, e.g. by putting the shells on top of each other. Thus, an uncontrolled force is used to assemble the blade shells. This conventional procedure provides only minimal control of the bond line formed between the blade shells. Furthermore, a large amount of adhesive is required which increases cost and weight of the rotor blades.

BRIEF DESCRIPTION OF THE INVENTION

In view of the above, a method for forming a bond between a first and a second shell of a blade is provided. The method comprises the steps of forming a cavity between said first and second blade shells and filling an adhesive into said cavity to form a bond line between said first and second blade shells.

Further aspects, advantages and features of the present invention are apparent from the dependent claims, the description and the accompanying drawings.

According to a first aspect of the present invention, a method for forming a bond line between a first and a second half of a blade is provided. The method includes the steps of providing an elongated recess in at least the first blade half; abutting the second blade half to said first blade half so that a hollow space is formed between said first and second blade halves by said elongated nut; and injecting or infusing an adhesive into said hollow space to form a bond line between said first and second blade halves.

According to a further aspect of the present invention, a method for forming a bond between a first and a second shell of a blade. The method includes the steps of forming a groove in at least the first blade shell; disposing an expandable adhesive in said groove; disposing the second blade shell onto said first blade shell so that a cavity is formed between said first and second blade shells by said groove containing the expandable adhesive; and expanding said expandable adhesive to form a bond line between said first and second blade shells.

Both methods according to different aspects of the present invention provide better control of the formation of the bond line between the parts to be assembled. In particular, the adhesive is guided and retained within a cavity formed when the blade shells are assembled. Furthermore, the size and cross-sectional shape of the cavity can be pre-determined in view of the parts to be assembled and the loads onto these parts during operation of the blade. Thus, the invention provides better control over the process of forming a bond line. In addition, the amount of adhesive used can be reduced so that cost and weight of the rotor blade can be saved.

According to another aspect of the present invention, a shell for a wind turbine rotor blade is provided. The blade shell includes a groove formed in a region of a bond line so that said groove forms a cavity when being covered with a complementary blade shell.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying figures wherein.

DETAILED DESCRIPTION OF THE INVENTION

Reference will now be made in detail to the various embodiments of the invention, one or more examples of which are illustrated in the figures. Each example is provided by way of explanation of the invention, and is not meant as a limitation of the invention. For example, features illustrated or described as part of one embodiment can be used on or in conjunction with other embodiments to yield yet a further embodiment. It is intended that the present invention includes such modifications and variations.

Figure 1:
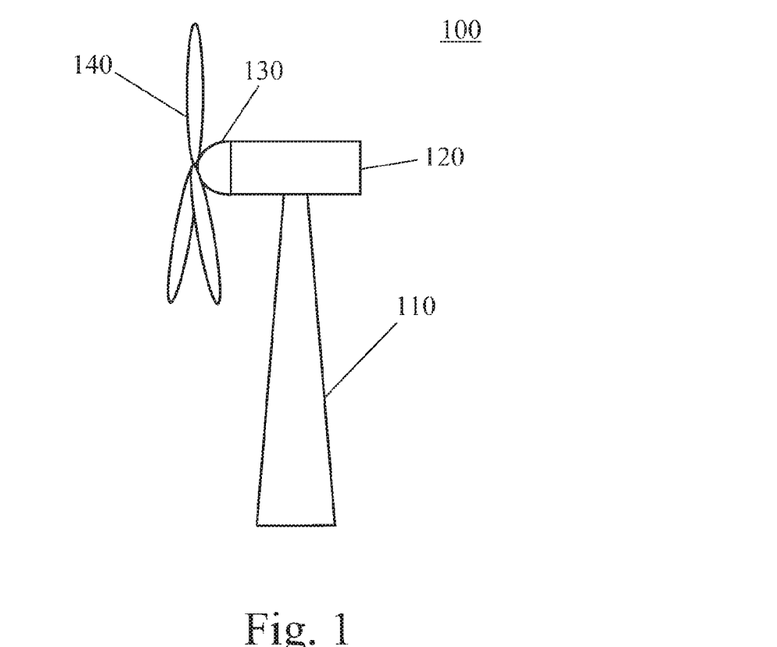
FIG. 1 is a schematic view of a wind turbine.

FIG. 1 is a schematic view of a wind turbine 100. Wind turbine 100 has a tower 110 on which a machine nacelle 120 is mounted. Typically, machine nacelle 120 houses an electric generator, a gear box and a turbine control device (not shown). A wind rotor for converting kinetic wind energy into rotational energy is mounted to one end of nacelle 130. The wind rotor includes a hub 130 mounted to nacelle 130 in a rotatable manner so that it can rotate about a horizontal axis. Furthermore, three rotor blades 140 are mounted to hub 130. Typically, rotor blades 140 are rotatable about their longitudinal axis so that the pitch angle of the rotor blades can be adjusted.

Figure 2:
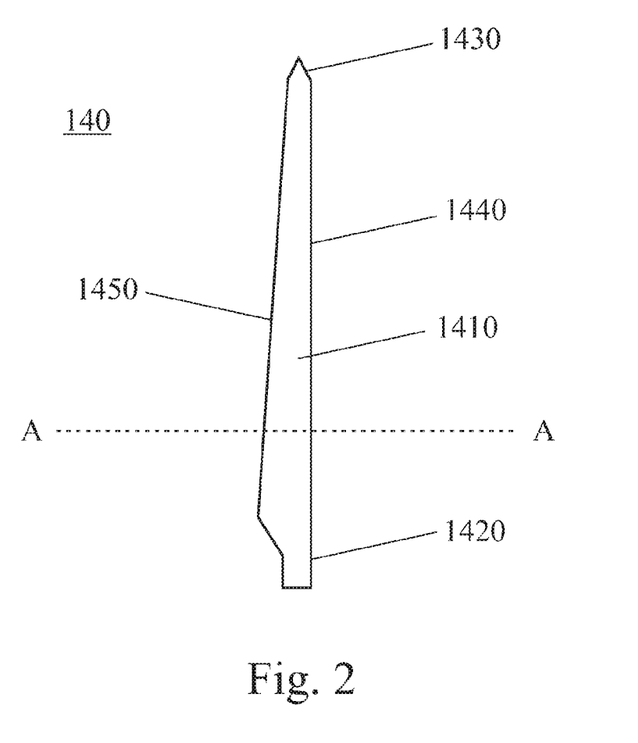
FIG. 2 shows a rotor blade for a wind turbine.

FIG. 2 shows a rotor blade 140 of wind turbine 100 in more detail. Rotor blade 140 has a blade body 1410 which extends between a blade root 1420 and a tip end 1430 in a longitudinal or spanwise direction of the rotor blade 140. Typically, blade body 1410 is made of a fiber-reinforced material, e.g. glass fiber, carbon fiber, organic aramide fibers or the like. Rotor blade 140 is mounted to hub 130 at the root portion 1420 of the blade. The blade body further includes a leading edge 1440 and a trailing edge 1450. If the rotor blade is of a composite design, the upper and lower blade shells are typically joined together along the leading and trailing edges 1440, 1450 of the blade as will be explained below.

Figure 3:
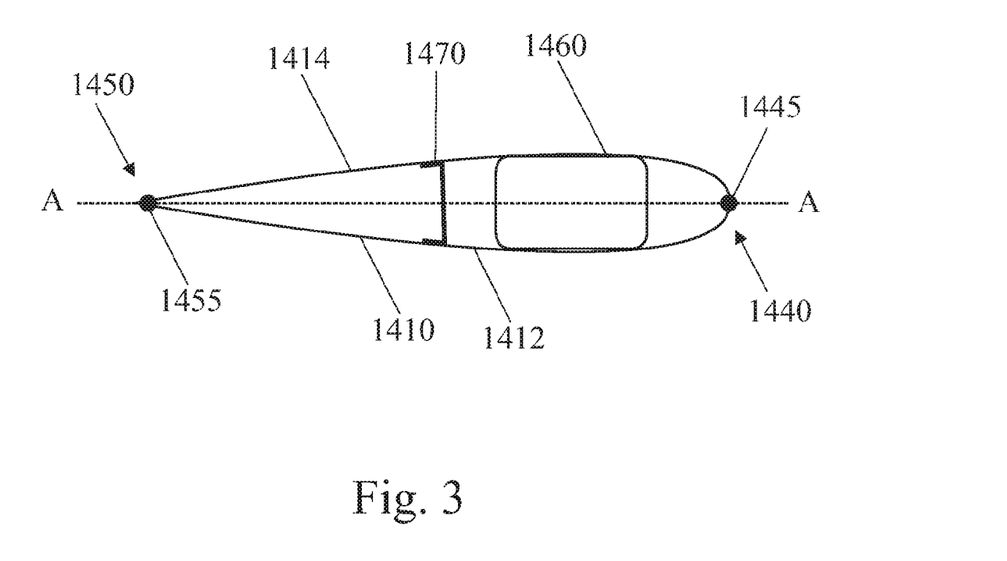
FIG. 3 is a cross-sectional view of the rotor blade shown in FIG. 2 along line A-A.

FIG. 3 is a cross-sectional view of the rotor blade shown in FIG. 2 along line A-A. Therein, it is shown that blade body 1410 extends between the leading edge 1440 and the trailing edge 1450 in a chordwise direction A-A. Blade body 1410 is formed of a first blade shell 1412 and a second blade shell 1414 which are joined at the leading and trailing edges 1440, 1450. The first and second blade shells 1412, 1414 may also be referred to as first and second blade halves, respectively. The first and second halves of blade body 1410 are bonded together at the leading and trailing edges 1440, 1450, respectively, so that a leading edge bond line 1445 and a trailing edge bond line 1455 are formed. Typically, the bond lines are formed by use of a suitable adhesive like polyurethane, epoxy resins, vinyl esters, methacrylate, or a combination thereof.

Furthermore, a spar 1460 is provided within the blade body 1410 to provide increased resistance to bending and/or torsion to blade body 1410 under wind loading. Furthermore, a shear web 1470 is provided to provide increased resistance to shear forces to blade body 1410 under wind loading. Typically but not being limited thereto, spar 1460 and shear web 1470 are both made of a fiber-reinforced material, e.g. glass fiber, carbon fiber, organic aramide fibers or the like. Furthermore, spar 1460 and/or shear web 1470 may be bonded to one or both of blade shells 1412, 1414. Accordingly, bond lines (not shown) have to be formed between spar 1460 and/or shear web 1470 and at least one of the first and second blade shells 1412, 1414. Of course, the present invention can be applied to forming these bond lines of spar 1460 and/or shear web 1470. Spar 1460 and shear web 1470 are optional but typical features of wind turbine rotor blades. However, it should be understood that the present invention can also be carried out without providing spar 1460 and/or shear web 1470.

Figure 4:
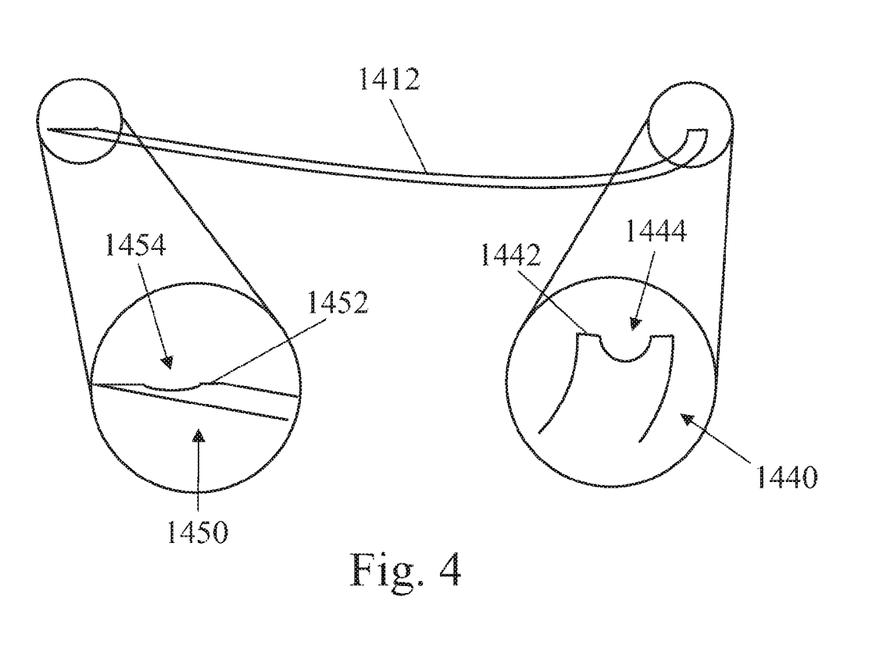
FIG. 4 is a cross-sectional view of a blade shell of a rotor blade according to an embodiment of the present invention.

FIG. 4 is a cross-sectional view of a blade shell of a rotor blade according to an embodiment of the present invention. Therein, the configuration of a blade shell 1412 utilizing the present invention is shown in more detail. An enlarged view of the trailing edge 1440 of blade shell 1412 shows that blade shell 1412 has contact surface 1442 configured to mate with a similar contact surface of the other blade half. A groove 1444 is formed in contact surface 1442 and extends in a direction of a desired bond line to be formed, e.g. in the spanwise direction of the blade from root to tip. Typically, groove 1444 is integrally formed as an elongated recess having a round, semi-circular or semi-elliptical cross section. However, other cross-sectional shapes, e.g. polygonal or triangular, may be used if applicable. Furthermore, the width, depth, and/or shape of groove 1444 may be constant over its full length but may also vary if desired. A similar trailing edge groove 1454 is provided at the trailing edge portion 1450 of blade shell 1412. As is shown on the left-hand side of FIG. 4, the trailing edge groove 1454 is formed in a contact surface 1452 of the trailing edge portion 1450 of blade shell 1412. Of course, the above explanations with regard to the leading edge groove also apply to the trailing edge groove.

Figure 5:
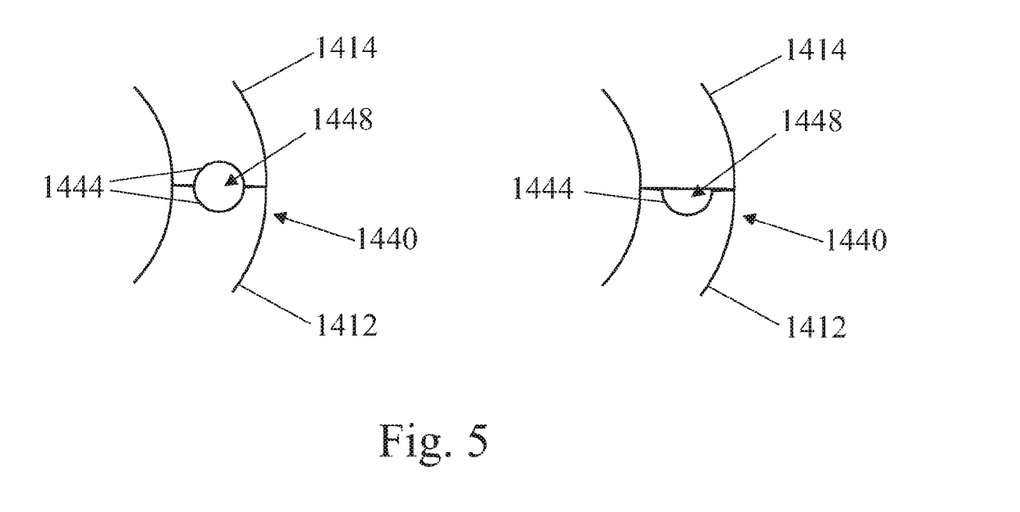
FIG. 5 shows details of blade shells according to different embodiments of the present invention.

FIG. 5 shows details of blade shells according to different embodiments of the present invention. On the left-hand side of FIG. 5, the leading edge portion 1440 of a blade is shown. Therein, the first blade shell 1412 and the second blade shell 1414 are abutting at their respective contact surfaces. Each of the blade shells 1412, 1414 has a groove 1444 formed therein. Since the grooves 1444 are aligned with each other, they form a cavity 1448 within the leading edge portion 1440 of the blade. A similar but somewhat different embodiment is shown on the right-hand side of FIG. 5. Therein, only the first blade shell 1412 has a groove 1444 formed therein whereas the second blade shell 1414 does not have such a groove. However, there is still a cavity 1448 formed when the first shell 1412 is covered with the second blade shell 1414. Although not shown in detail herein, it should be understood that similar cavities can be formed at the trailing edge portion 1450 of the blade 140 by providing at least one trailing edge groove 1455 in the first and/or second blade shell.

Figure 6:
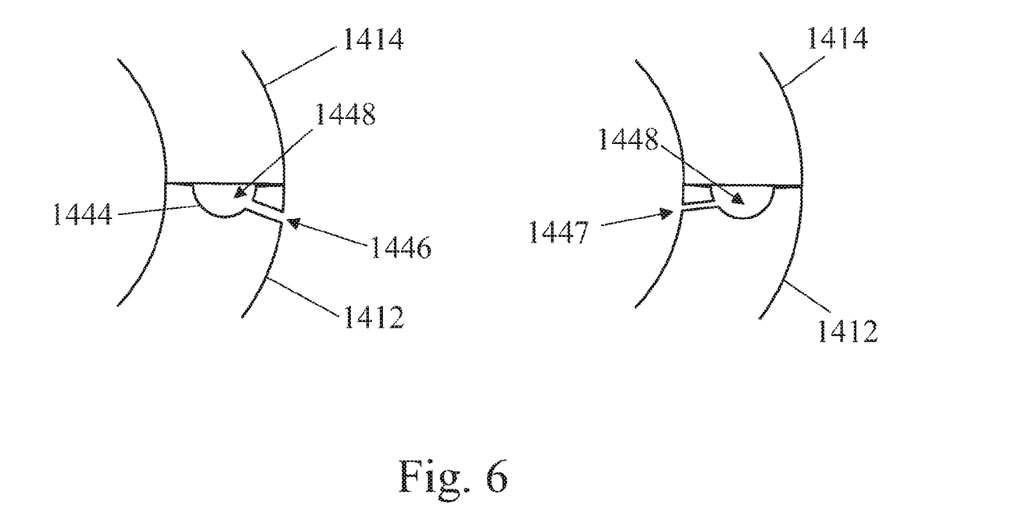
FIG. 6 shows details of blade shells according to different further embodiments of the present invention.

FIG. 6 shows details of blade shells according to different further embodiments of the present invention. The embodiment shown on the left-hand side of FIG. 6 is similar to the embodiment shown on the right-hand side of FIG. 5. However, a further injection hole 1446 is provided, wherein the injection hole extends between cavity 1448 and the outside atmosphere. In the embodiment shown in FIG. 6, the injection hole 1446 extends from cavity 1448 toward the outer surface of blade shell 1412. However, it is also possible for injection hole 1446 to extend from cavity 1448 toward the inner surface of blade shell 1412. According to a further configuration, injection hole 1446 may extend from cavity 1448 towards the inner and/or outer surfaces of the second blade shell 1414. When forming a bond line, an adhesive will be injected into cavity 1448 through injection hole 1446. Therefore, the exact position and configuration of injection hole 1446 will be determined by the injector used to inject the adhesive. For example, the mouth of injection hole 1446 may be specifically adapted to receive a nozzle of the injector. Furthermore, specifically designed plugs may be provided to close injection hole 1446 after the adhesive has been injected. It should also be considered that access to injection hole 1446 is easier when it is located on the outer surface of blade shell 1412. However, the aerodynamical properties of the blade may be deteriorated by injection hole 1446, thus pointing towards a location of injection hole 1446 on the inner surface of blade shell 1412 as an interesting alternative.

On the right-hand side of FIG. 6, another feature according to an embodiment of the present invention is shown. Therein, a vent hole 1447 extends between cavity 1448 and the inner surface of the blade shell 1412. Of course, vent hole 1447 may alternatively or additionally extend from cavity 1448 to the outer surface of blade shell 1412. According to an even further configuration, vent hole 1447 may extend from cavity 1448 towards the inner and/or outer surfaces of the second blade shell 1414. The one or more vent holes 1447 serve for exhausting air or gas from cavity 1448 during the bond line forming process. In particular, when an adhesive is injected into cavity 1448 the adhesive pushes away the air contained in the cavity which is, in turn, let out through vent holes 1447. Also, the adhesive injected into the cavity may outgas so that a considerable amount of gas is produced inside cavity 1448. Such gas can be exhausted through vent holes 1447. Typically, the diameter of vent holes 1447 is smaller, and more typically considerably smaller, than the diameter of an injection hole 1446.

Although the above embodiments of the present invention have been discussed with respect to the leading edge portion 1440 of the blade, it will be readily understood by the skilled reader that similar configurations can be applied to other portions where bond lines are to be formed. Especially, similar configurations having grooves and/or injection holes and/or vent holes can be applied to such portions as the trailing edge portion, the spar and/or the shear web.

Figure 7:
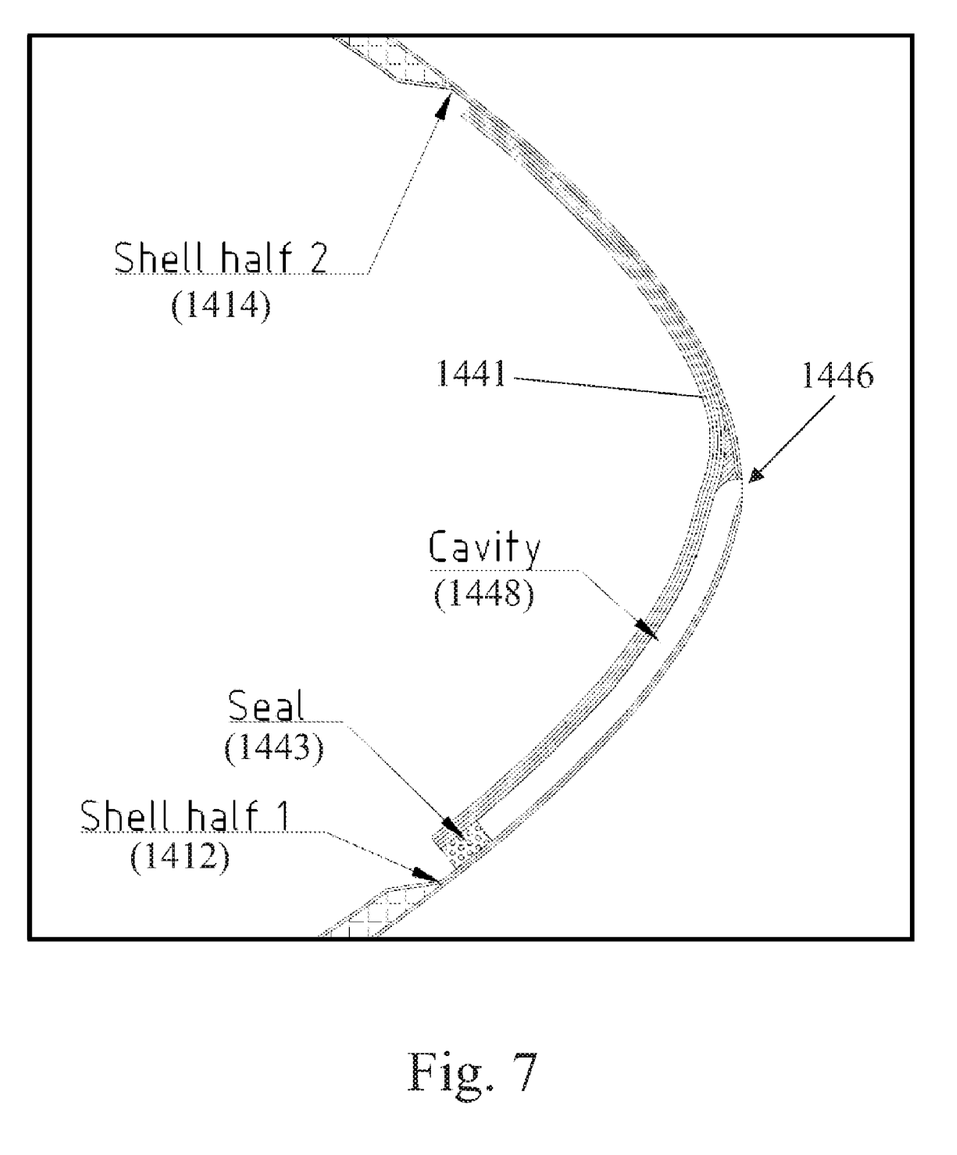
FIG. 7 shows a cross-sectional view of an arrangement according to a further embodiment of the present invention.

FIG. 7 shows a cross-sectional view of an arrangement according to a further embodiment of the present invention. Therein, the cavity 1448 is not formed by a groove or recess within one or both of the blade shells 1412, 1414 but is formed by an additional enclosure 1441 attached to the inside of the first and second blade shells 1412, 1414 to form a cavity 1448. In the present embodiment, one end of the enclosure 1441 is sealed by a vacuum-tight seal 1443. Thus, cavity 1448 is adapted for vacuum infusion of an adhesive. For this purpose, an infusion opening 1446 is formed in the outer surface of the blade shells. Adhesive 500 can be infused into cavity 1448 by vacuum infusion. Of course, cavity 1448 may also be filled with adhesive by an injection technique in which case opening 1446 serves as an injection opening. Furthermore, vent holes (not shown) may be provided either in the blade shells 1412, 1414 or the enclosure 1441 if an adhesive injection technique is selected.

Figure 8:
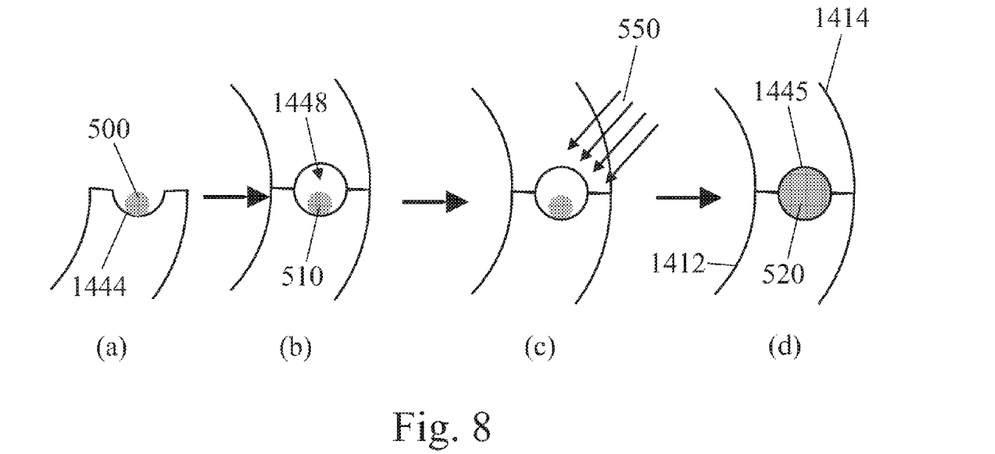
FIG. 8 shows a method according to an embodiment of the present invention.

FIG. 8 shows a method according to an embodiment of the present invention. In a first step (a) according to this method, an expandable adhesive 500 is disposed in a groove 1444 formed in a blade shell. Next, in step (b) the second blade shell is put onto the first blade shell, so that a cavity 1448 is formed in which expandable adhesive 500 is contained in an unexpanded state 510. Subsequently, the adhesive 500 is expanded in step (c) by applying an expansion means. For example, expandable adhesive 500 may be expanded by exposing it to UV light and/or by exposing it to heat. Additionally or alternatively a foaming agent and/or a chemical hardener may be applied to adhesive 500 either prior to or after step (b). For example, the foaming agent and/or chemical hardener may be injected into cavity 1448 through injection holes 1446. Finally, in step (d) the adhesive is in an expanded state 520 filling cavity 1448 and forming a well-defined bond line between the first and second blade shells 1412, 1414. Typically, the expandable adhesive is selected from the group consisting of polyurethane, epoxy resins, vinyl esters, methacrylate, or any combination thereof. However, also other expandable adhesives and expansion methods than the ones described above are well-known in the art and may be applied within the scope of the present invention.

Figure 9:
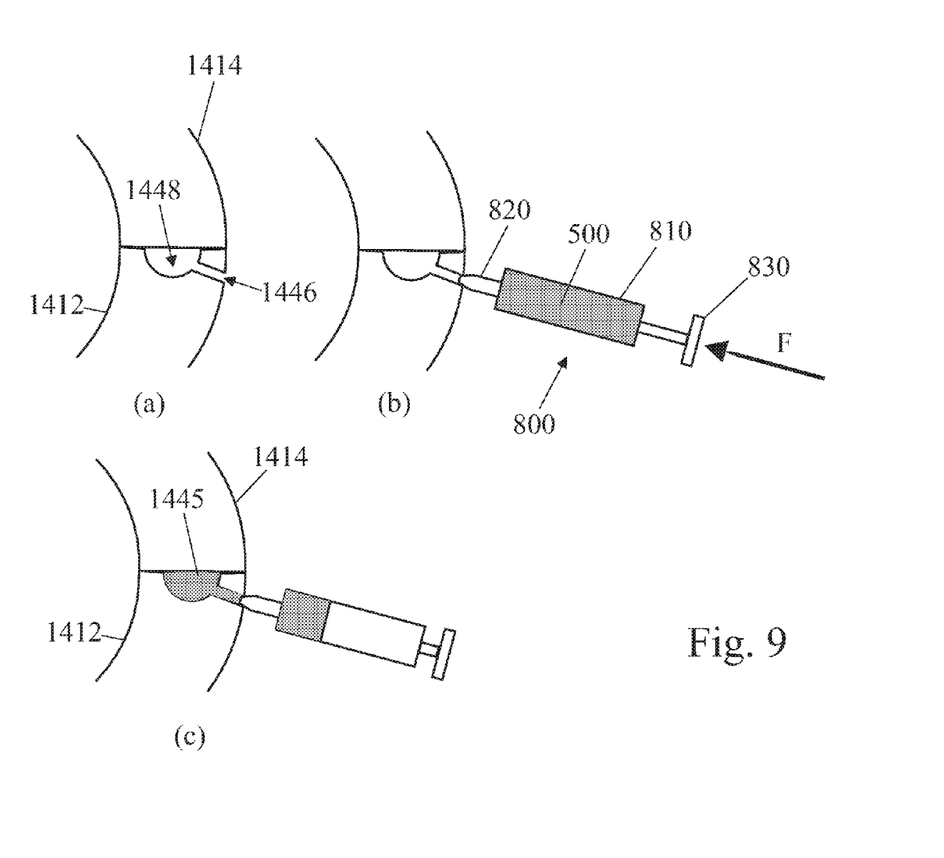
FIG. 9 shows a method according to another embodiment of the present invention.

FIG. 9 shows a method according to another embodiment of the present invention. In a first step (a), the first and second blade shells 1412, 1414 are disposed onto each other to form a cavity 1448 in the way described above. An injection hole 1446 of the configuration described above is provided in an outer surface of the first blade shell 1412. As described above, the injection hole 1446 may also be located on an inner surface of blade shell 1412 or on an inner or outer surface of the second blade shell 1414. Next, an injector 800 is applied to the mouth of injection hole 1446 in step (b). In the present embodiment, injector 800 includes an adhesive tank 810 holding an amount of adhesive 500, a nozzle 820 adapted to fit to injection hole 1446 and a pump 830 adapted to pump adhesive 500 into cavity 1448. Of course also other suitable configurations of injector 800 can be applied without deviating from the scope of the present invention. A force F is applied to pump 830 to press down a piston (not shown) to inject adhesive 500 into cavity 1448. Finally, in step (c) the injected adhesive 500 fills the cavity 1448 to form a well-defined bond line 1445 between the first and second blade shells 1412, 1414. During injection, the adhesive will displace any air or gas within cavity 1448. Therefore, a vent hole 1447 of the above-describes configuration may be provided. Thus, the air or gas inside cavity 1448 can be exhausted through the vent hole when adhesive 500 is injected into cavity 1448. Typically, the adhesive is selected from the group consisting of polyurethane, epoxy resins, vinyl esters, methacrylate, or any combination thereof. However, also other adhesives and injection methods than the ones described above are well-known in the art and may be applied within the scope of the present invention.

Although injection of the adhesive into cavity 1448 is described above, it should be understood that also other techniques of filling cavity 1448 with adhesive can be applied. Especially, infusion is such a technique well-known in the art. When applying the infusion technique, a vacuum is applied to cavity 1448 so that the adhesive is drawn into cavity 1448. In other words, adhesive 500 is infused into cavity 1448 by applying a vacuum to cavity 1448.

Figure 10:
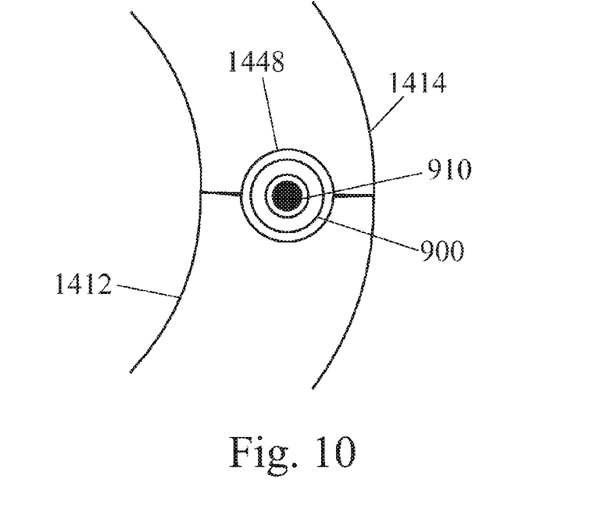
FIG. 10 is a cross-sectional view of an arrangement used in an embodiment of the present invention.

FIG. 10 is a cross-sectional view of an arrangement used in an embodiment of the present invention. Therein, a hose 900 having a nozzle 910 is disposed inside cavity 1448 formed between the first and second blade shells 1412, 1414. Hose 900 is disposed inside cavity 1448 in a retractable manner. For example, a clearance may be provided between hose 900 and the surface of groove 1444, i.e. the cross-sectional area of hose 900 is smaller that the cross-sectional area of cavity 1448. Additionally or alternatively, a lubricant may be disposed on the outer surface of hose 900 and/or on the surfaces of grooves 1444, 1454 so that retracting of hose 900 is facilitated. The use of hose 900 will now be explained with reference to FIG. 11.

Figure 11:
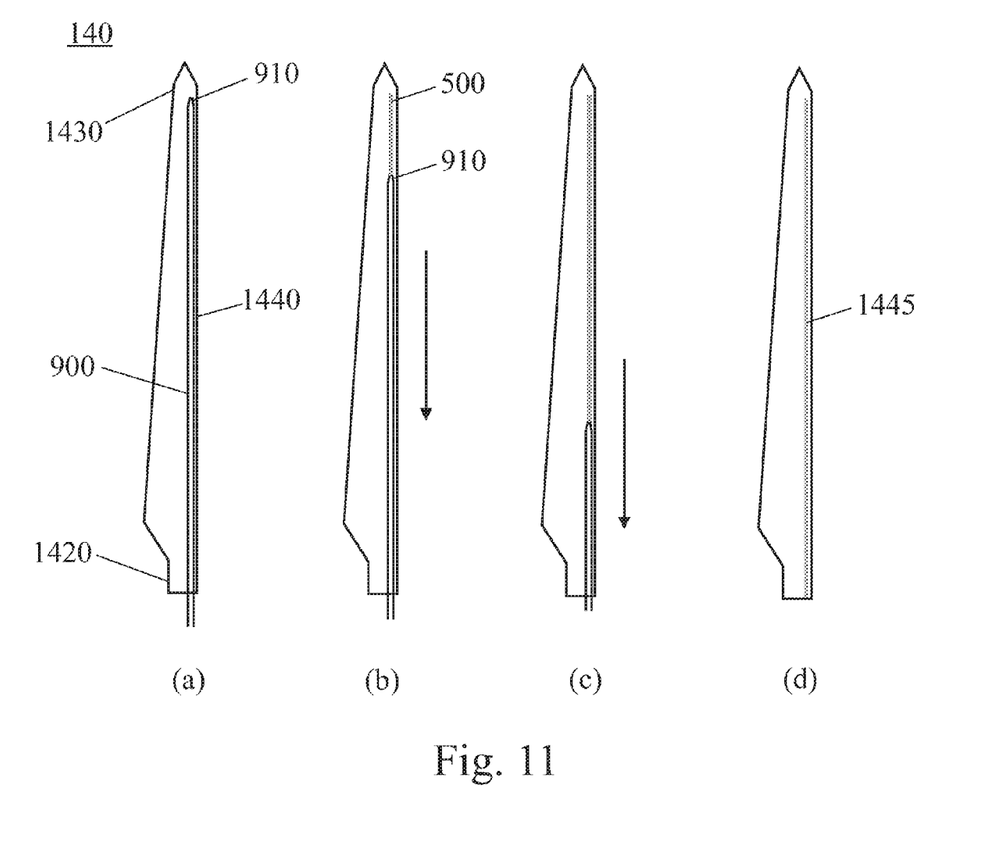
FIG. 11 shows a method according to an even further embodiment of the present invention.

FIG. 11 shows a method according to an even further embodiment of the present invention. Therein, a plain view of a rotor blade 140 is shown in step (a). In the manufacturing state shown in step (a), the first and second blade shells are put onto each other. Furthermore, a hose 900 is disposed inside the cavity 1448 formed by the leading edge grooves 1444. The nozzle 910 of hose 900 is located at the tip end portion 1430 of blade 140 and hose 900 extends down to the root portion 1420. In steps (b) and (c) it is shown how hose 900 is retracted inside cavity 1448 while, simultaneously, adhesive 500 is injected into cavity 1448 through hose 900. The skilled reader will understand that the retraction speed of hose 900 and the pumping rate of adhesive 500 have to be adjusted with respect to another so that cavity 1448 is reliably filled with adhesive 500. Finally, in step (d) a well-defined bond line 1445 is formed inside cavity 1448 in a controlled manner.

Although the above embodiments of the present invention have been discussed and shown with respect to the leading edge portion 1440 of the blade, it will be readily understood by the skilled reader that similar configurations can be applied to other portions where bond lines are to be formed. Especially, similar configurations having grooves and/or injection holes and/or vent holes can be applied to such portions as the trailing edge portion, the spar and/or the shear web.

This written description uses examples to disclose the invention, including the best mode, and also to enable any person skilled in the art to make and use the invention. While the invention has been described in terms of various specific embodiments, those skilled in the art will recognize that the invention can be practiced with modification within the spirit and scope of the claims. Especially, mutually non-exclusive features of the embodiments described above may be combined with each other. The patentable scope of the invention is defined by the claims, and may include other examples that occur to those skilled in the art. Such other examples are intended to be within the scope of the claims of they have structural elements that do not differ from the literal language of the claims, or if they include equivalent structural elements with insubstantial differences from the literal languages of the claims.

PARTS LIST 100 wind turbine
110 tower
120 nacelle
130 hub
140 rotor blade
500 adhesive
510 unexpanded adhesive
520 expanded adhesive
550 UV light, heat, etc.
800 injector
810 adhesive tank
820 nozzle
830 pump
900 hose
910 nozzle
1410 blade body
1412 first blade shell
1414 second blade shell
1420 blade root
1430 blade tip
1440 leading edge
1441 enclosure
1442 contact surface
1443 seal
1444 groove
1445 leading edge bond line
1446 injection hole
1447 vent hole
1448 cavity
1450 trailing edge
1455 trailing edge bond line
1460 spar
1470 shear web
F force

What is claimed is:

1. A method for forming a bond between a first blade shell and a second blade shell of a blade, the first blade shell and the second blade shell comprising respective leading edge contact surfaces that face each other and respective trailing edge contact surfaces that face each other when the first blade shell is mounted to the second blade shell, the method comprising the steps of:
   forming a cavity between at least one of (a) the leading edge contact surfaces and (b) the trailing edge contact surfaces of said first blade shell and said second blade shell;
   filling an adhesive into said cavity to form a bond line between said first blade shell and said second blade shell.

2. The method according to claim 1, wherein the adhesive is injected into the cavity.

3. The method according to claim 1, wherein the adhesive is infused into the cavity.

4. The method according to claim 1, wherein a groove is formed in at least one of the first blade shell and the second blade shell so that the cavity is formed by said groove when the first blade shell and the second blade shell are mounted to each other.

5. The method according to claim 4, wherein the at least one of the first blade shell and the second blade shell has at least one vent hole extending between said groove and a surface of the at least one of the first blade shell and the second blade shell.

6. The method according to claim 1, wherein a hose is disposed in said cavity and said adhesive is injected through said hose.

7. The method according to claim 6, wherein the hose is gradually retracted from said cavity while injecting the adhesive.

8. The method according to claim 6, wherein the cavity extends between a root portion of the rotor blade and a tip portion of the rotor blade, and wherein the hose is retracted from the tip portion to the root portion.

9. The method according to claim 1, wherein the adhesive is selected from the group consisting of polyurethane, epoxy resins, vinyl esters, methacrylate, or any combination thereof.

10. A method for forming a bond between a first blade shell and a second blade shell of a blade, the first blade shell and the second blade shell comprising respective leading edge contact surfaces that face each other and respective trailing edge contact surfaces that face each other when the first blade shell is mounted to the second blade shell, the method comprising the steps of:
    forming a cavity between at least one of (a) the leading edge contact surfaces and (b) the trailing edge contact surfaces of said first blade shell and said second blade shell;
    disposing an expandable adhesive in said cavity; and
    expanding said expandable adhesive to form a bond line between said first blade shell and said second blade shell.

11. The method according to claim 10 wherein the expandable adhesive is disposed in a groove formed in at least the first blade shell and, subsequently, the second blade shell is mounted to the first blade shell so that the cavity comprising the expandable adhesive is formed.

12. The method according to claim 10, wherein the expandable adhesive is expanded by at least one of by exposing the expandable adhesive to UV light, by exposing the expandable adhesive to heat, by use of a foaming agent and by use of a chemical hardener.

13. The method according to claim 10, wherein the expandable adhesive is selected from the group consisting of polyurethane, epoxy resins, vinyl esters, methacrylate, or any combination thereof.

14. The method according to claim 1, wherein the adhesive is an expandable adhesive, the method further comprising the step of expanding the expandable adhesive to form the bond line between said first blade shell and said second blade shell.

15. The method according to claim 14, wherein the expandable adhesive is disposed in a groove formed in at least the first blade shell and, subsequently, the second blade shell is mounted to the first blade shell so that the cavity comprising the expandable adhesive is formed.

16. The method according to claim 14, wherein the expandable adhesive is expanded by at least one of by exposing the expandable adhesive to UV light, by exposing the expandable adhesive to heat, by use of a foaming agent and by use of a chemical hardener.

17. The method according to claim 14, wherein the expandable adhesive is selected from the group consisting of polyurethane, epoxy resins, vinyl esters, methacrylate, or any combination thereof.

* * * * *